United States Patent [19]

Miyoshi et al.

[11] Patent Number: 5,282,156
[45] Date of Patent: Jan. 25, 1994

[54] LEADING ONE ANTICIPATOR AND FLOATING POINT ADDITION/SUBTRACTION APPARATUS EMPLOYING SAME

[75] Inventors: Akira Miyoshi, Hirakata; Takashi Taniguchi, Moriguchi, both of Japan

[73] Assignee: Matsushita Electric Industrial Co., Ltd., Osaka, Japan

[21] Appl. No.: 825,999

[22] Filed: Jan. 27, 1992

[30] Foreign Application Priority Data

Jan. 31, 1991 [JP] Japan .................................. 3-10700

[51] Int. Cl.$^5$ .............................................. G06F 7/38
[52] U.S. Cl. ................................ 364/748; 364/715.04
[58] Field of Search ............ 364/715.01, 715.04, 364/715.1, 715.11, 748

[56] References Cited

U.S. PATENT DOCUMENTS

| | | | |
|---|---|---|---|
| 4,758,973 | 7/1988 | Ooyama et al. | 364/748 |
| 4,758,974 | 7/1988 | Fields et al. | 364/748 |
| 4,785,421 | 11/1988 | Takahashi | 364/715.1 X |
| 4,864,527 | 9/1989 | Peng et al. | 364/748 |
| 4,878,192 | 10/1989 | Nishiyama et al. | 364/768 |
| 4,926,369 | 5/1990 | Hokenek et al. | 364/748 |

FOREIGN PATENT DOCUMENTS

61-26136 2/1986 Japan .
61-282928 12/1986 Japan .
63-170733 7/1988 Japan .
3-22132 1/1991 Japan .
3-83125 4/1991 Japan .

*Primary Examiner*—Jerry Smith
*Assistant Examiner*—Chuong D. Ngo
*Attorney, Agent, or Firm*—Ratner & Prestia

[57] ABSTRACT

A floating point addition/subtraction apparatus is internally provided with a leading one anticipator having redundant binary numeral generators, intermediate-carry/intermediate-sum generators, and scan-value generators. Each of the redundant binary numeral generators performs a subtraction with respect to two binary operands, a binary minuend and a binary subtrahend, to generate a redundant binary numeral Zsd having "$-1$", "0" or "1" at each digit thereof. Each of the intermediate-carry/intermediate-sum generators generates an intermediate carry $C_k$ and an intermediate sum $S_k$ in accordance with $Zsd_k = 2C_k + S_k$ using a redundant binary numeral $Zsd_k$ positioned at a $k^{th}$ digit from a least significant digit of the redundant binary numeral $Zsd$ and a redundant binary numeral $Zsd_{k+1}$ positioned at a $(k+1)^{th}$ digit so that $C_k = Zsd_k$ when $Zsd_{k+1} = $ "1" or "$-1$" and $C_k = 0$ when $Zsd_{k+1} = $ "0". Each of the scan-value generators generates "1" (or "0") when a result of an addition with respect to an intermediate carry $C_{k-1}$ and the intermediate sum $S_k$ is "0" and generates "0"(or "1") when the result of the addition is a numeral other than "0".

8 Claims, 5 Drawing Sheets

LEADING ONE ANTICIPATOR AND FLOATING POINT ADDITION/SUBTRACTION APPARATUS EMPLOYING SAME

BACKGROUND OF THE INVENTION

1. Field of the Invention

The present invention relates generally to an arithmetic processor and more particularly to a high-speed leading one anticipator capable of anticipating the uppermost position of significant digits in the result of a floating point addition or subtraction. The leading one anticipator according to the present invention is particularly effective when non-significant digits are generated at upper-order digit positions upon addition or subtraction of two floating point data each having a mantissa part, an exponent part, and a sign part. The present invention also relates to a floating point addition/subtraction apparatus employing a leading one anticipator of the above-described type.

2. Description of the Prior Art

Conventionally, when a mantissa subtraction is performed with respect to two floating point data X and Y each having a mantissa part, an exponent part, and a sign part, a digit alignment, a mantissa addition or subtraction, and a normalization are performed in this order.

Figure 1:
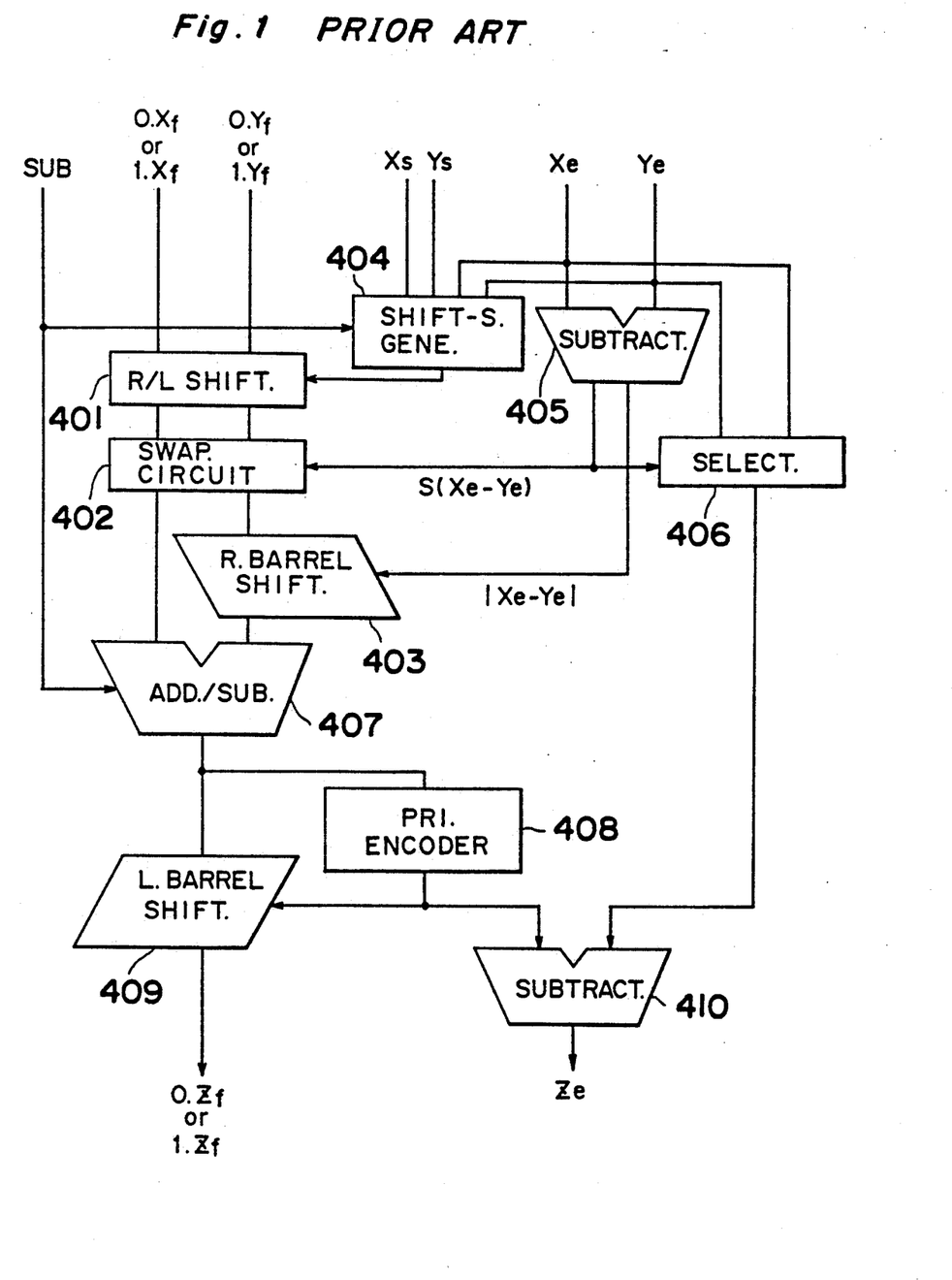
FIG. 1 is a block diagram of a conventional floating point addition/subtraction apparatus.

The digit alignment is initially discussed hereinafter with reference to FIG. 1 depicting a conventional floating point addition/subtraction apparatus.

Exponent parts (Xe, Ye) of two operands are inputted into a subtracter 405, a SHIFT-signal generator 404, and a selector 406. At the same time, mantissa parts (1.Xf or 0.Xf, 1.Yf or 0.Yf) of the two operands are inputted into a right/left shifter 401, which shifts the mantissa parts right or left by one digit. The subtracter 405 performs a subtraction with respect to the exponent values Xe and Ye to calculate an absolute value $|Xe-Ye|$ and a sign value $S(Xe-Ye)$. At the same time, the SHIFT-signal generator 404 detects whether or not the individual operands are normalized numbers with the use of respective exponent values Xe and Ye and generates control signals required for shifting respective mantissa values right or left by one digit with the use of respective sign values (Xs, Ys) and a subtraction signal SUB. This control is disclosed, for example in Japanese Patent Application No. 1-38687. Based on the control signals from the SHIFT-signal generator 404, the right/left shifter 401 shifts the two mantissa values right or left. Outputs from the right/left shifter 401 are inputted into a swapping circuit 402 in which they are swapped in accordance with the sign value $S(Xe-Ye)$ outputted from the subtracter 405 so that the mantissa value of one operand having an exponent value not greater than that of the other operand may be inputted into a right barrel shifter 403 whereas the mantissa value of the latter having a greater exponent value may be inputted into an adder/subtracter 407. The right barrel shifter 403 shifts right the mantissa value inputted thereinto by the absolute value $|Xe-Ye|$, which is indicative of the difference between the two exponent values and is outputted from the subtracter 405. The digit alignment is performed in this way.

The adder/subtracter 407 then performs an addition/subtraction processing and a rounding processing.

Subsequently, the normalization processing is discussed hereinafter.

When the result of a subtraction in which the exponent value Ye is subtracted from the exponent value Xe is "0", "1", or "−1", there is a possibility of a digit drop occurring in a mantissa part of the result of a subtraction with respect to the mantissa parts of the two operands. The digit drop is a phenomenon in which non-significant digits are generated at upper digit positions. A priority encoder (PE) 408 and a left barrel shifter 409 are required to normalize this mantissa value. An output from the adder/subtracter 407 is inputted to both the PE 408 and the left barrel shifter 409. Based on the output from the adder/subtracter 407, the PE 408 detects a left shift amount required for normalization, and based on the left shift amount detected by the PE 408, the left barrel shifter 409 normalizes the result of the mantissa subtraction.

As to the two exponent values Xe and Ye inputted into the selector 406, one exponent value which is not less than the other is selected in accordance with the sign value $S(Xe-Ye)$. An output from the selector 406 is inputted into a subtracter 410, which subtracts the shift amount detected by the PE 408 therefrom to obtain an exponent value of the result of a floating point addition/subtraction.

In this way, in order to normalize the result of the mantissa subtraction, the conventional floating point addition/subtraction apparatus detects the number of upper non-significant digits contained in the result of the mantissa subtraction by the use of the PE 408 and performs a normalization based on the amount detected.

Accordingly, the mantissa subtraction, the detection of the shift amount required for normalization, and the normalization are consecutively performed, thereby retarding the floating point addition/subtraction speed.

SUMMARY OF THE INVENTION

The present invention has been developed to overcome the above-described disadvantage.

It is accordingly an object of the present invention to provide a high-speed leading one anticipator capable of anticipating the number of upper non-significant digits or a leading significant digit in the result of a mantissa subtraction.

Another object of the present invention is to provide a floating point addition/subtraction apparatus employing a leading one anticipator of the above-described type. This apparatus can simultaneously perform a mantissa subtraction and an anticipation of the number of non-significant digits in the result of the subtraction, thereby significantly reducing the time required for operations.

In accomplishing these and other objects, a leading one anticipator according to the present invention comprises:

a first means for performing a subtraction with respect to a binary minuend having i digits and a binary subtrahend having j digits to generate a redundant binary numeral Zsd having "−1", "0" or "1" at each digit thereof, each of said i and j being an integer;

a second means for generating an intermediate carry $C_k$ and an intermediate sum $S_k$ in accordance with $Zsd_k = 2C_k + S_k$ by use of a redundant binary numeral $Zsd_k$ positioned at a $k^{th}$ digit from a least significant digit of said redundant binary numeral Zsd and a redundant binary numeral $Zsd_{k+1}$ positioned at a $(k+1)^{th}$ digit from said least significant digit so that $C_k = Zsd_k$ when $Zsd_{k+1} = $ "1" or "−1" and $C_k = 0$ when $Zsd_{k+1} = $ "0", said k being an integer; and a third means for generating a signal $Z_k$ so that said signal $Z_k$ indicates a first numeral when a result of an addition with respect to an intermediate carry $C_{k-1}$ transferred from a next-lower-order digit and said intermediate sum $S_k$ is "0" and said signal $Z_k$ indicates a second numeral when said result of the addition is a numeral other than "0".

Conveniently, the leading one anticipator can be constituted by three logic EX-NOR gates positioned at a first stage, two logic EX-OR gates positioned at a second stage, and a logic AND-NOR gate positioned at a third stage.

Alternatively, a logic EX-NOR gate of the first stage and a logic EX-OR gate of the second stage electrically connected thereto may be replaced by a logic EX-OR gate and a logic EX-NOR gate, respectively.

In another aspect of the present invention, a floating point addition/subtraction apparatus comprises an adder/subtracter for performing an addition or subtraction with respect to mantissa parts of two floating point operands after a digit alignment processing, a leading one anticipator of the above-described type, a left barrel shifter for receiving a result of a subtraction performed by the adder/subtracter, and a priority encoder for receiving an output from the leading one anticipator to determine the number of non-significant digits from a most significant digit.

In this apparatus, the result of the subtraction received by the left barrel shifter is shifted left in compliance with an output from the priority encoder, and a normalization processing is performed in parallel with an addition or subtraction of the mantissa parts of the two operands.

BRIEF DESCRIPTION OF THE DRAWINGS

These and other objects and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 2:
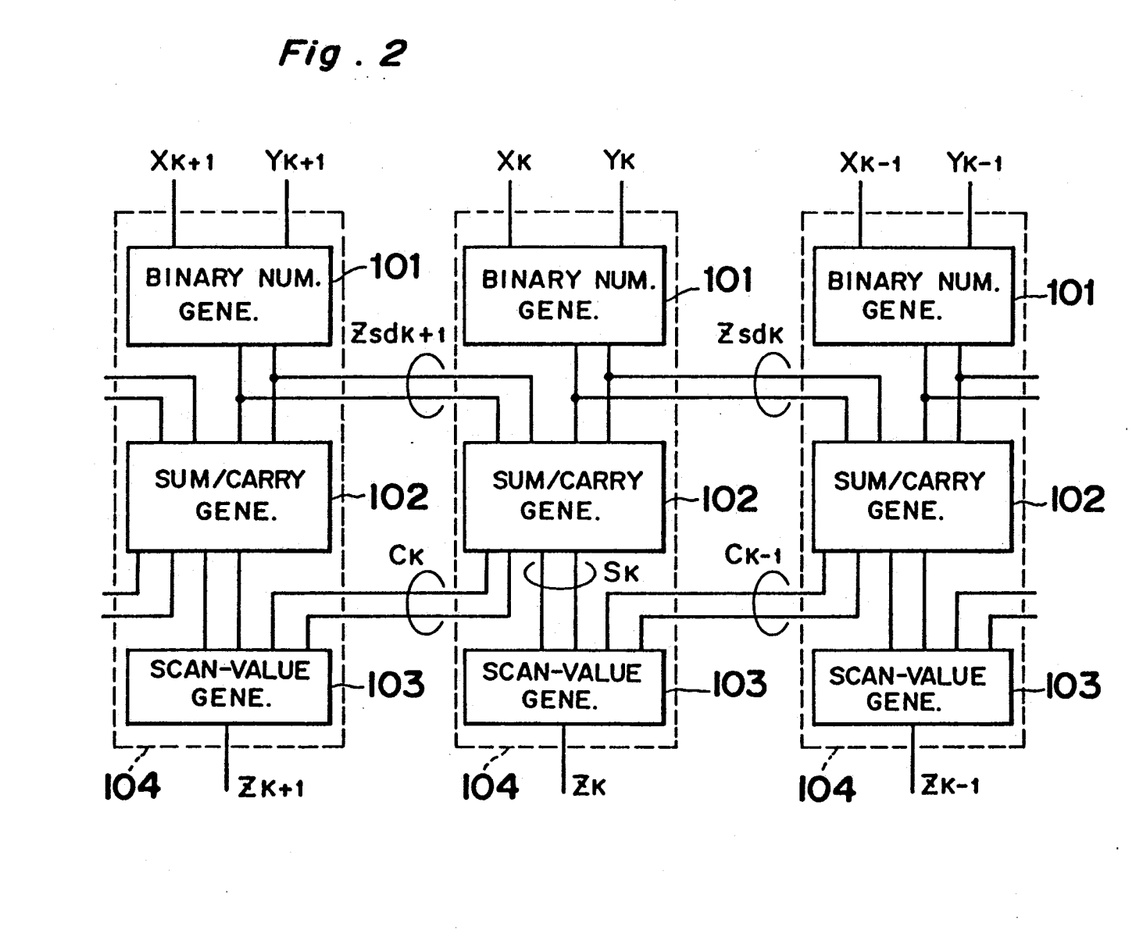
FIG. 2 is a block diagram of a leading one anticipator according to the present invention.

Referring now to the drawings, there is shown in FIG. 2 a leading one anticipator embodying the present invention.

In floating point operations, when a subtraction is performed with respect to mantissa values of two operands and the difference between exponent values thereof is "0", "1", or "−1", there is a possibility of a digit drop occurring in a mantissa part of the result of a mantissa subtraction. The leading one anticipator according to the present invention can anticipate the amount of digit drop of the mantissa part at a high speed. In this embodiment are indicated those three digits of a minuend X and a subtrahend Y that have respective weights of $2^{k-1}$ to $2^{k+1}$, where k is an integer.

The processing for a digit having a weight of $2^k$ is discussed hereinafter.

In FIG. 2, each of redundant binary numeral generators 101 generates a redundant binary numeral Zsd for each digit from the minuend X and the subtrahend Y. Each of intermediate-carry/intermediate-sum generators 102 generates an intermediate carry $C_k$ and an intermediate sum $S_k$ in accordance with $Zsd_k = 2C_k + S_k$ with the use of a redundant binary numeral $Zsd_k$ having a weight of $2^k$ and a redundant binary numeral $Zsd_{k+1}$ having a next higher weight of $2^{k+1}$. Both of $C_k$ and $S_k$ are also redundant binary numerals. With the use of the intermediate sum $S_k$ and an intermediate carry $C_{k-1}$ transferred from the next-lower-order digit, each of scan-value generators 103 outputs "0" when $C_{k-1} + S_k = 0$ and "1" when $C_{k-1} + S_k \neq 0$. Reference numeral 104 represents a constituent element of the leading one anticipator for each digit.

Table 1 indicates a truth table of each redundant binary numeral generator 101.

TABLE 1

| $X_k$ | $Y_k$ | $Zsd_k$ |
|---|---|---|
| 0 | 0 | 0 |
| 0 | 1 | −1 |
| 1 | 1 | 0 |
| 1 | 0 | 1 |

In Table 1, $X_k$ and $Y_k$ are values at the $k^{th}$ digit position of a minuend and a subtrahend, respectively. From these values, a redundant binary numeral $Zsd_k$ is generated in accordance with $X_k - Y_k = Zsd_k$.

The redundant binary numeral $Zsd_k$ generated in the redundant binary numeral generator 101 together with a redundant binary numeral $Zsd_{k+1}$ having a next higher weight is inputted into the intermediate-carry/intermediate-sum generator 102, which generates the intermediate sum $S_k$ and the intermediate carry $C_k$ in accordance with Formula (1) with reference to the redundant binary numeral $Zsd_{k+1}$.

$$Zsd_k = 2C_k + S_k \qquad (1)$$

Formula (2) indicates the intermediate carry $C_k$ and the intermediate sum $S_k$ obtained from Formula (1).

$(C_k, S_k) = (0, 0)$ when $Zsd_k = 0$ $(C_k, S_k) = (0, 1)$ or $(1, -1)$ when $Zsd_k = 1$ $(C_k, S_k) = (0, -1)$ or $(-1, 1)$ when $Zsd_k = -1$ \qquad (2)

As can be understood from Formula (2), when the redundant binary numeral $Zsd_k$ is "1" or "−1", there are two combinations of the intermediate carry $C_k$ and the intermediate sum $S_k$, respectively. In this embodiment, the combinations of the intermediate carry $C_k$ and the intermediate sum $S_k$ shown in Formula (2) are determined as indicated in Table 2 with reference to the redundant binary numeral $Zsd_{k+1}$ having a next higher weight. In Table 2, when the redundant binary numeral $Zsd_{k+1}$ is "1" or "−1", those of the combinations are selected in which $C_k = Zsd_k$. When the redundant binary numeral $Zsd_{k+1}$ is "0", those of the combinations are selected in which $C_k = 0$.

TABLE 2

| $Zsd_{k+1}$ | $Zsd_k$ | $C_k$ | $S_k$ |
|---|---|---|---|
| 1 | 1 | 1 | −1 |
| 1 | 0 | 0 | 0 |
| 1 | −1 | −1 | 1 |
| 0 | 1 | 0 | 1 |
| 0 | 0 | 0 | 0 |
| 0 | −1 | 0 | −1 |
| −1 | 1 | 1 | −1 |
| −1 | 0 | 0 | 0 |
| −1 | −1 | −1 | 1 |

Subsequently, the scan-value generator 103 generates a value $Z_k$ with the use of the intermediate sum $S_k$ and the intermediate carry $C_k$ generated by the intermediate-carry/intermediate-sum generator 102. In this embodiment, the value $Z_k$ is generated based on a logic as indicated in Table 3.

TABLE 3

| $C_{k-1}$ | $S_k$ | $Z_k$ |
|---|---|---|
| 1 | 1 | 1 |
| 1 | 0 | 1 |
| 1 | −1 | 0 |
| 0 | 1 | 1 |
| 0 | 0 | 0 |
| 0 | −1 | 1 |
| −1 | 1 | 0 |
| −1 | 0 | 1 |
| −1 | −1 | 1 |

In Table 3, the scan value $Z_k$ is "0" when $C_{k-1}+S_k=0$ and is "1" when $C_{k-1}+S_k\neq 0$.

With the use of the leading one anticipator having the above-described logics, an anticipation of the amount of digit drop in the result of a subtraction is performed as follows.

The redundant binary numeral generators 101 generate a redundant binary numeral Zsd having a plurality of digits each represented by "−1", "0" or "1" as a result of a subtraction with respect to a binary minuend and a binary subtrahend. When a certain digit of the redundant binary numeral Zsd is "1", this means that the minuend X is "1" and the subtrahend is "0". When a certain digit of the redundant binary numeral Zsd is "−1", this means that the minuend X is "0" and the subtrahend is "1". When a certain digit of the redundant binary numeral Zsd is "0", this means that the minuend is equal to the subtrahend. In other words, the result of the subtraction with respect to the minuend and the subtrahend is represented by the redundant binary numeral Zsd in order that no "borrow" may be propagated in the subtraction.

In the redundant binary numeral Zsd, no significant digit exists at a digit position upper than the uppermost one of digit positions where a numeral other than "0" exists.

For example, Formula (3) represents the case in which the leading numeral in the redundant binary numeral Zsd is "1", exclusive of "0". In the case of Formula (4), the leading numeral is "−1", exclusive of "0".

$$Zsd = 00001*..* \quad (3)$$

$$Zsd = 0000T*..* \quad (4)$$

where * is "−1", "0" or "1" and T = −1.

Formula (3) can take values in the range of Formula (5).

$$Zsd|_{max} = 00001111..111 \quad (5)$$

$$Zsd|_{min} = 00001TTT..TTT$$

As can be readily understood from Formula (5), when the redundant binary numeral Zsd indicated by Formula (3) is converted to a binary numeral, no significant digit exists at a digit position upper than the digit position where the leading one of numerals other than "0" exists.

As indicated by Formula (4), when "−1" is the leading numeral, exclusive of "0", in the redundant binary numeral Zsd, Formula (4) can take values in the range of Formula (6).

$$Zsd|_{max} = 0000T111..111 \quad (6)$$

$$Zsd|_{min} = 0000TTTT..TTT$$

Numerals represented by Formula (6) are all negative, and the binary form thereof is represented by Formula (7).

$$max = 11111111..111 \quad (7)$$

$$min = 11110000..001$$

When the result of a subtraction is negative, non-significant digits are a series of "1s" continued from the uppermost digit place, and the leading significant digit is at a digit position where the leading numeral exists, exclusive of "1". From Formulas (6) and (7), it can be readily understood that even when the result of the subtraction is negative, the redundant binary numeral Zsd has no significant digit at a digit position upper than the digit position where the leading numeral exists, exclusive of "0".

As discussed above, the position of the leading significant digit can be found out from the redundant binary numeral Zsd obtained as a result of a subtraction with respect to two operands, a minuend and a subtrahend.

A redundant binary numeral $Zsd_k$ generated at the $k^{th}$ digit position is then inputted into the intermediate-carry/intermediate-sum generator 102, in which the redundant binary numeral $Zsd_k$ is divided into an intermediate sum $S_k$ and an intermediate carry $C_k$. Both the intermediate sum $S_k$ and the intermediate carry $C_k$ are inputted into the scan-value generator 103, which outputs a scan value $Z_k$ based on the intermediate sum $S_k$ and an intermediate carry $C_{k-1}$ transferred from the next-lower-order digit. When the result of an addition of the intermediate sum $S_k$ and the intermediate carry $C_{k-1}$ is "0", the scan value $Z_k$ is "0", and when the result of the addition is other than "0", the scan value $Z_k$ is "1".

With the use of such a circuit, the position of the leading significant digit can be anticipated more accurately as follows, thereby proving the reasonability of Table 2 above. Description is made with reference to Formula (8).

In Formula (8), a redundant binary numeral Zsd includes n certain redundant binary numerals (*&) in succession from the least significant digit position to the $n^{th}$ digit position and m digits of "0" in succession at upper digits from the $(n+1)^{th}$ digit position, where each of m and n is an integer.

$$Zsd = 00..00\&^{*}..^{*} \quad (8)$$

where *="1", "0" or "−1" and &="1" or "−1".

Consideration is given with respect to three digits at the $(n+1)^{th}$, the $n^{th}$, and the $(n-1)^{th}$ digit positions from the least significant digit position. These digits are indicated by Formula (9).

$$(Zsd_{n+1}, Zsd_n, Zsd_{n-1}) = (0, \&, *) \quad (9)$$

Formula (9) can be divided into the following three groups.

(i) $(Zsd_{n+1}, Zsd_n, Zsd_{n-1}) = (0, 1, 1)$ or $(0, T, T)$
(ii) $(Zsd_{n+1}, Zsd_n, Zsd_{n-1}) = (0, 1, 0)$ or $(0, T, 0)$
(iii) $(Zsd_{n+1}, Zsd_n, Zsd_{n-1}) = (0, 1, T)$ or $(0, T, 1)$ Hereupon, (i) is the case in which $Zsd_n$ and $Zsd_{n-1}$ are numerals having the same sign. (ii) is the case in which $Zsd_{n-1}$ is "0". (iii) is the case in which $Zsd_n$ and $Zsd_{n-1}$ are numerals having opposite signs.

In the case (i), the leading significant digit is at the $n^{th}$ digit position from the least significant digit position. Hereupon, let it be considered how to divide each digit into an intermediate sum and an intermediate carry with reference to the case in which $(Zsd_{n+1}, Zsd_n, Zsd_{n-1}) = (0, 1, 1)$. Various combinations of the intermediate sum and the intermediate carry are shown in Formula (2), as discussed above.

When $Zsd_{n+1} = 0$, there exists only one combination, $(C, S)_{n+1} = (0, 0)$ where $(C, S)_{n+1}$ represents a combination of an intermediate sum and an intermediate sum at the $(n+1)^{th}$ digit position. When $Zsd_n = 1$, there are two combinations, $(C, S)_n = (0, 1)$ and $(1, T)$. In this embodiment, $(C, S)_n = (0, 1)$ is adopted. If $(C, S)_n = (1, T)$ in which $C_n = 1$ is adopted, a scan value at the $(n+1)^{th}$ digit position is $Z_{n+1} = C_n + S_{n+1} = 1$. As a result, in a scan value Z, the digit position of the leading "1" (hereinafter referred to as the leading one position of the scan value) is one digit upper than the leading significant digit position. Accordingly, when a certain numeral is divided into an intermediate sum and an intermediate carry and a numeral one digit upper than it is "0", the division must be carried out so that $(C, S)_n = (0, 1)$.

Subsequently, attention is paid to $(Zsd_n, Zsd_{n-1}) = (1, 1)$. When $Zsd_{n-1} = 1$, there exist two combinations of an intermediate sum and an intermediate carry at the $(n-1)^{th}$ digit position, $(C, S)_{n-1} = (1, T)$ and $(0, 1)$. Because the leading one position of the scan value must be at the $n^{th}$ digit from the least significant digit position $(Z_n = 1)$, the division is carried out so that $C_{n-1} + S_n \neq 0$. When $(C, S)_n = (0, 1)$, $C_{n-1} + S_n \neq 0$ whichever of "1" and "0" is adopted as $C_{n-1}$, and therefore, the scan value $Z_n = 1$. Accordingly, when $(Zsd_n, Zsd_{n-1}) = (1, 1)$, it is possible to adopt either $(C, S)_{n-1} = (1, T)$ or $(0, 1)$.

The above is summarized as follows. When $(C, S)_{n-1} = (1, T)$,

|     | n + 1 | n | n − 1 |
|-----|-------|---|-------|
| Zsd | 0     | 1 | 1     |
| S   | 0     | 1 | T     |
| C   | 0     | 0 | 1     |
| Z   | 0     | 0 | 1     |

When $(C, S)_{n-1} = (0, 1)$,

|     | n + 1 | n | n − 1 |
|-----|-------|---|-------|
| Zsd | 0     | 1 | 1     |
| S   | 0     | 1 | 1     |
| C   | 0     | 0 | 0     |
| Z   | 0     | 0 | 1     |

Although the above is discussed with respect to the case in which $(Zsd_{n+1}, Zsd_n, Zsd_{n-1}) = (0, 1, 1)$, the same is true for the case in which $(Zsd_{n+1}, Zsd_n, Zsd_{n-1}) = (0, T, T)$.

From the above, $Zsd_k$ is divided into an intermediate sum $S_k$ and an intermediate carry $C_k$ as follows in consideration of $Zsd_{k+1}$.

When $(Zsd_{k+1}, Zsd_k) = (0, 1)$, $(C, S)_k = (0, 1)$.
When $(Zsd_{k+1}, Zsd_k) = (1, 1)$, $(C, S)_k = (0, 1)$ or $(1, T)$.
When $(Zsd_{k+1}, Zsd_k) = (0, T)$, $(C, S)_k = (0, T)$.
When $(Zsd_{k+1}, Zsd_k) = (T, T)$, $(C, S)_k = (0, T)$ or $(T, 1)$.

In the case (ii), the leading significant digit is at the $n^{th}$ digit position when there exists a numeral having the same sign as that of $Zsd_n$ at a digit position lower than the $(n-1)^{th}$ digit position. On the other hand, the leading significant digit is at the $(n-1)^{th}$ digit position when there exists a numeral having a sign opposite to that of $Zsd_n$ at a digit position lower than the $(n-1)^{th}$ digit position.

Hereupon, consideration is given to the case in which the leading one position of the scan value is the same as the leading significant digit position. By way of example, let the case be considered in which $(Zsd_{n+1}, Zsd_n, Zsd_{n-1}) = (0, 1, 0)$. Because $(C, S)_n = (0, 1)$ and $Zsd_{n-1} = 0$, $(C, S)_{n-1} = (0, 0)$ from Formula (2). Accordingly, the scan value $Z_n = 1(C_{n-1} + S_n = 1)$, and the leading one position of the scan value becomes the $n^{th}$ digit from the least significant digit position. When there exists "−1" at a digit position lower than the $(n-1)^{th}$ digit, i.e., when a numeral having a sign opposite to that of $Zsd_n$ at a digit position lower than the $(n-1)^{th}$ digit, the leading one position of the scan value indicates a position one digit upper than the leading significant digit position. Although consideration has been given to the case in which $(Zsd_{n+1}, Zsd_n, Zsd_{n+1}) = (0, 1, 0)$, the above is true for the case in which $(Zsd_{n+1}, Zsd_{n+1}, Zsd_n, Zsd_{n-1}) = (0, T, 0)$.

Subsequently, let the case (iii) be considered. When a numeral of $Zsd_{n-1}$ is followed by the same numeral more than zero at digit positions of and below the $(n-2)^{th}$ digit, the leading significant digit position is the digit position at which the continuation of the numerals is broken or the next-lower-order digit position.

Hereupon, consideration is given to the case in which the leading one position of the scan value is the same as the leading significant digit position. By way of example, let the case be considered in which $(Zsd_{n+1}, Zsd_n, Zsd_{n-1}) = (0, 1, T)$. As discussed above, when $(Zsd_{n+1}, Zsd_n) = (0, 1)$, $(C, S)_n = (0, 1)$. When $(Zsd_n, Zsd_{n-1}) = (1, T)$, the scan value at the $n^{th}$ digit position must be made to be $Z_n = 0$ because the leading significant digit is at a digit position lower than the $n^{th}$ digit. In other words, because $S_n=1$, $(C, S)_n$ must be selected so that $C_{n-1}=T$. Accordingly, $(C, S)_{n-1}=(T, 1)$ is selected because $Zsd_{n-1}=T$.

The above is summarized as follows.

|     | n + 1 | n | n − 1 |
| --- | --- | --- | --- |
| Zsd |   | 0 | 1 | T |
| S   |   | 0 | 1 | 1 |
| C   | 0 | 0 | T |   |
| Z   | 0 | 0 | 0 |   |

Furthermore, in the case (iii), let the case be considered in which $Zsd_{n-2}=T$. Because the leading significant digit is at a digit position lower than the $(n-2)^{th}$ digit, the scan value must be $Z_{n-1}=0$. Because $S_{n-1}=1$, $(C, S)_{n-2}$ must be selected so that $C_{n-2}=T$. Accordingly, $(C, S)_{n-2}=(T,1)$ is selected because $Zsd_{n-2}=T$. This is summarized as follows.

|     | n + 1 | n | n − 1 | n − 2 |
| --- | --- | --- | --- | --- |
| Zsd |   | 0 | 1 | T | T |
| S   |   | 0 | 1 | 1 | 1 |
| C   | 0 | 0 | T | T |   |
| Z   | 0 | 0 | 0 | 0 |   |

Accordingly, in the case (iii), when $(Zsd_{n-1}, Zsd_{n-2})=(T, T)$, $(C, S)_{n-2}=(T, 1)$ must be used. If $(C, S)_{n-2}=(0, T)$ is used, the leading one position of the scan value completely differs from the leading significant digit position.

Although the above is applied to the case in which $(Zsd_{n+1}, Zsd_n, Zsd_{n-1})=(0, 1, T)$, the same is true for the case in which $(Zsd_{n+1}, Zsd_n, Zsd_{n-1})=(0, T, 1)$.

From the above, it can be readily understood that $Zsd_k$ is preferably divided, in view of a redundant binary numeral $Zsd_k$ positioned one digit upper than it, into an intermediate sum and an intermediate carry as follows.

When $(Zsd_{k+1}, Zsd_k)=(0, 1)$, $(C, S)_k=(0, 1)$.
When $(Zsd_{k+1}, Zsd_k)=(1, T)$, $(C, S)_k=(T, 1)$.
When $(Zsd_{k+1}, Zsd_k)=(1, 1)$, $(C, S)_k=(1, T)$.
When $(Zsd_{k+1}, Zsd_k)=(0, T)$, $(C, S)_k=(0, T)$.
When $(Zsd_{k+1}, Zsd_k)=(T, 1)$, $(C, S)_k=(1, T)$.
When $(Zsd_{k+1}, Zsd_k)=(T, T)$, $(C, S)_k=(T, 1)$.

From (i), when the same numeral other than "0" continues $((Zsd_{k+1}, Zsd_k)=(1, 1)$ or $(T, T))$, there are two combinations for $(C, S)_k$. However, the condition (iii) limits $(C, S)_k$ to only one combination when the same numeral other than "0" continues. In other words, from (i), (ii), and (iii), the rule for generating an intermediate sum and an intermediate carry is tabulated, in view of the next-upper-order numeral, into Table 2. When the scan value Z is generated with the use of the rule as shown in Table 2, the leading one position of the scan value indicates the same digit position as the leading significant digit position or the digit position one digit upper than it.

From the foregoing, the leading one anticipator according to the present invention can anticipate, at the time of a subtraction, the leading one position of the scan value at a high speed irrespective of the number of digits.

Figure 3:
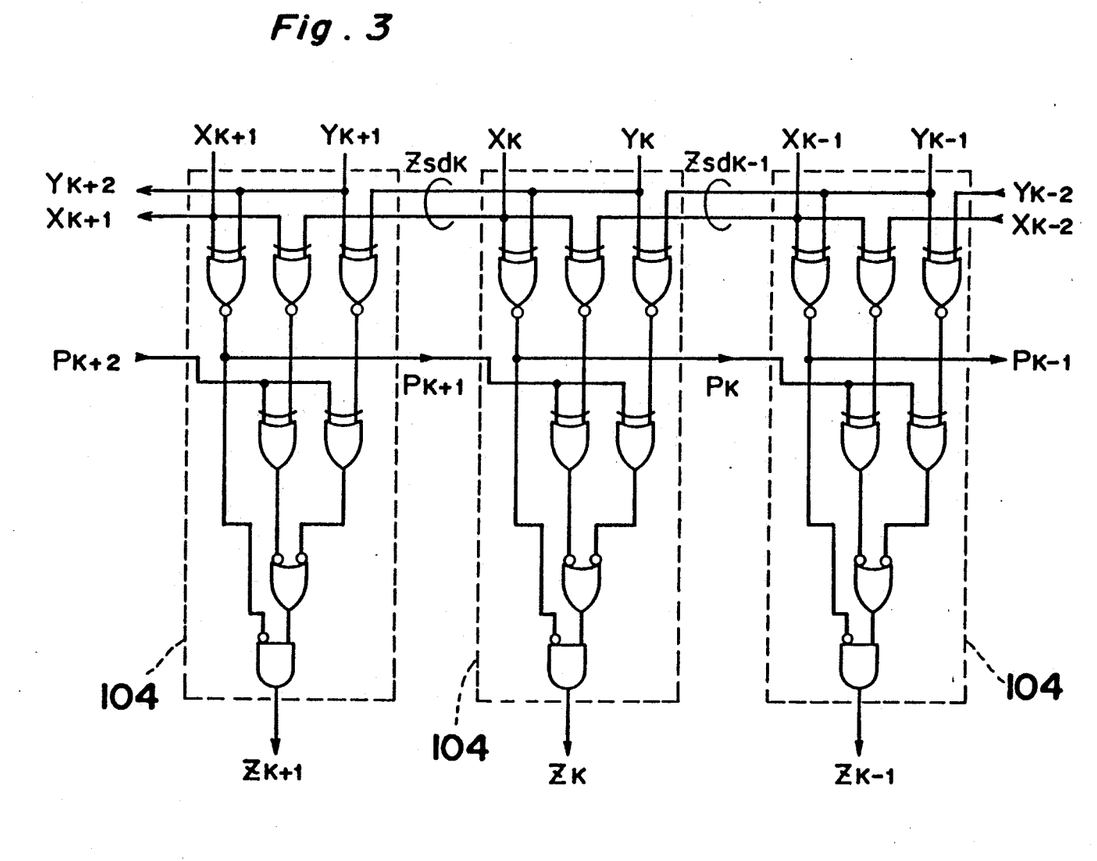
FIG. 3 is a logic diagram made in accordance with the leading one anticipator of FIG. 2.

FIG. 3 is a circuit diagram showing an example of the leading one anticipator according to the present invention.

A redundant binary numeral $Zsd_{k+1}$ inputted from the next-upper-order digit and an intermediate carry $C_{k-1}$ transferred from the next-lower-order digit, as shown in FIG. 2, are equivalent to signals $P_{k+1}$ and $Zsd_{k-1}$ shown in FIG. 3. The signal $P_k$ is a signal indicating that a redundant binary numeral is "0".

As shown in FIG. 3, the leading one anticipator includes a plurality of leading 1/0 detectors 104, each of which comprises three logic EX-NOR gates at a first stage, two logic EX-OR gates at a second stage, and a logic AND-NOR gate at a third stage.

In the circuit of FIG. 3, a binary numeral $X_k$ is inputted into the first and second logic EX-NOR gates whereas a binary numeral $Y_k$ is inputted into the first and third logic EX-NOR gates. The second and third logic EX-NOR gates also receive a binary numeral $X_{k-1}$ transferred from the next-lower-order digit and a binary numeral $Y_{k-1}$ transferred from the next-lower-order digit, respectively. An output from the second logic EX-NOR gate and that from the third logic EX-NOR gate are inputted into the first and second logic EX-OR gates, respectively. Both the first and second logic EX-OR gates also receive the signal $P_{k+1}$ transferred from the next-upper-order digit. An output from the first logic EX-NOR gate, that from the first logic EX-OR gate, and that from the second logic EX-OR gate are all inputted into the logic AND-NOR gate, which in turn outputs a scan value $Z_k$.

Because the circuit shown in FIG. 3 is constituted by three stages of logic operation units irrespective of the number of digits of a minuend and a subtrahend, the leading one anticipator according to the present invention can perform an anticipation in the amount of digit drop at the time of a subtraction more quickly than the case in which a subtraction is actually performed.

Figure 4:
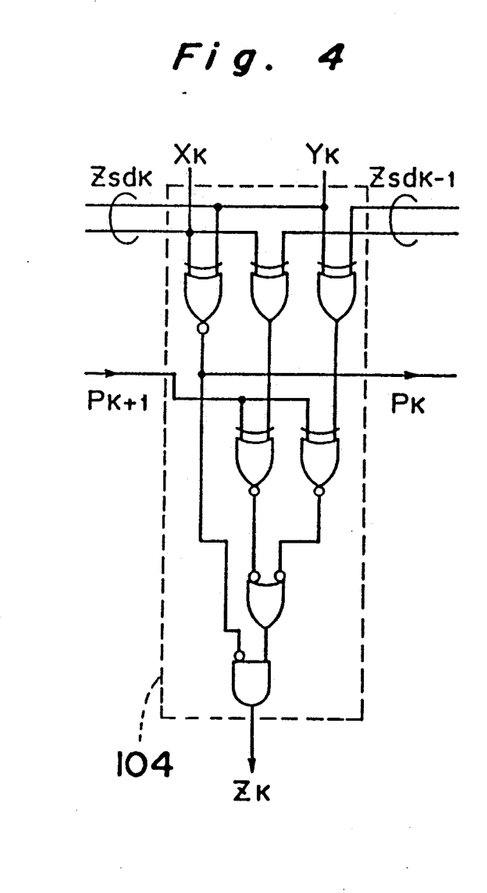
FIGS. 4 to 6 are modifications of the logic diagram of FIG. 3.
Figure 5:
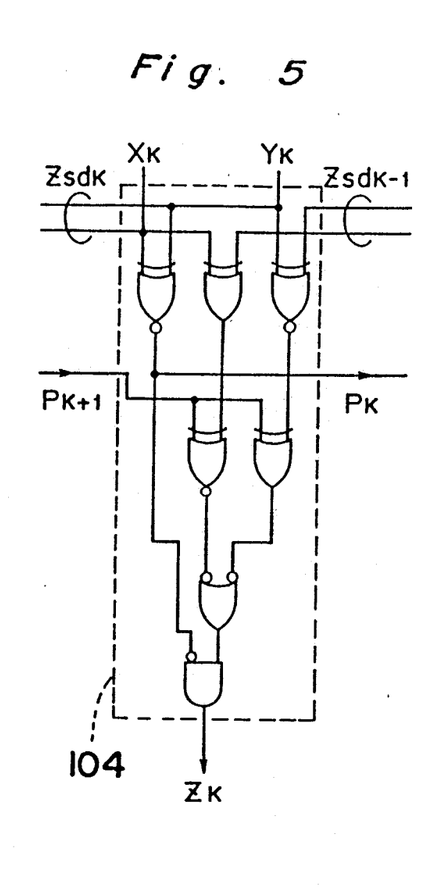
Figure 6:
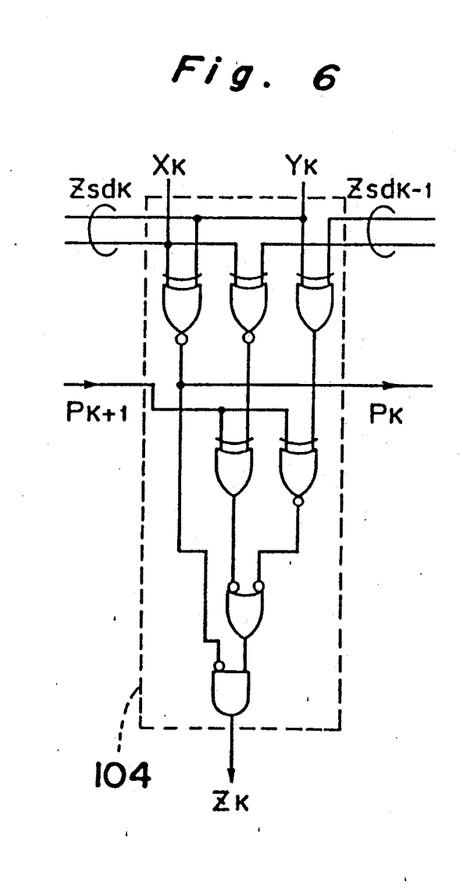

It is to be noted here that in the circuit diagram of FIG. 3, although each of the leading 1/0 detectors 104 includes three logic EX-NOR gates at the first stage and two logic EX-OR gates at the second stage, the second logic EX-NOR gate at the first stage and the first EX-OR gate at the second stage may be replaced by a logic EX-OR gate and a logic EX-NOR gate, respectively. Similarly, the third logic EX-NOR gate at the first stage and the second EX-OR gate at the second stage may be replaced by a logic EX-OR gate and a logic EX-NOR gate, respectively. These modifications are depicted in FIGS. 4 to 6.

Figure 7:
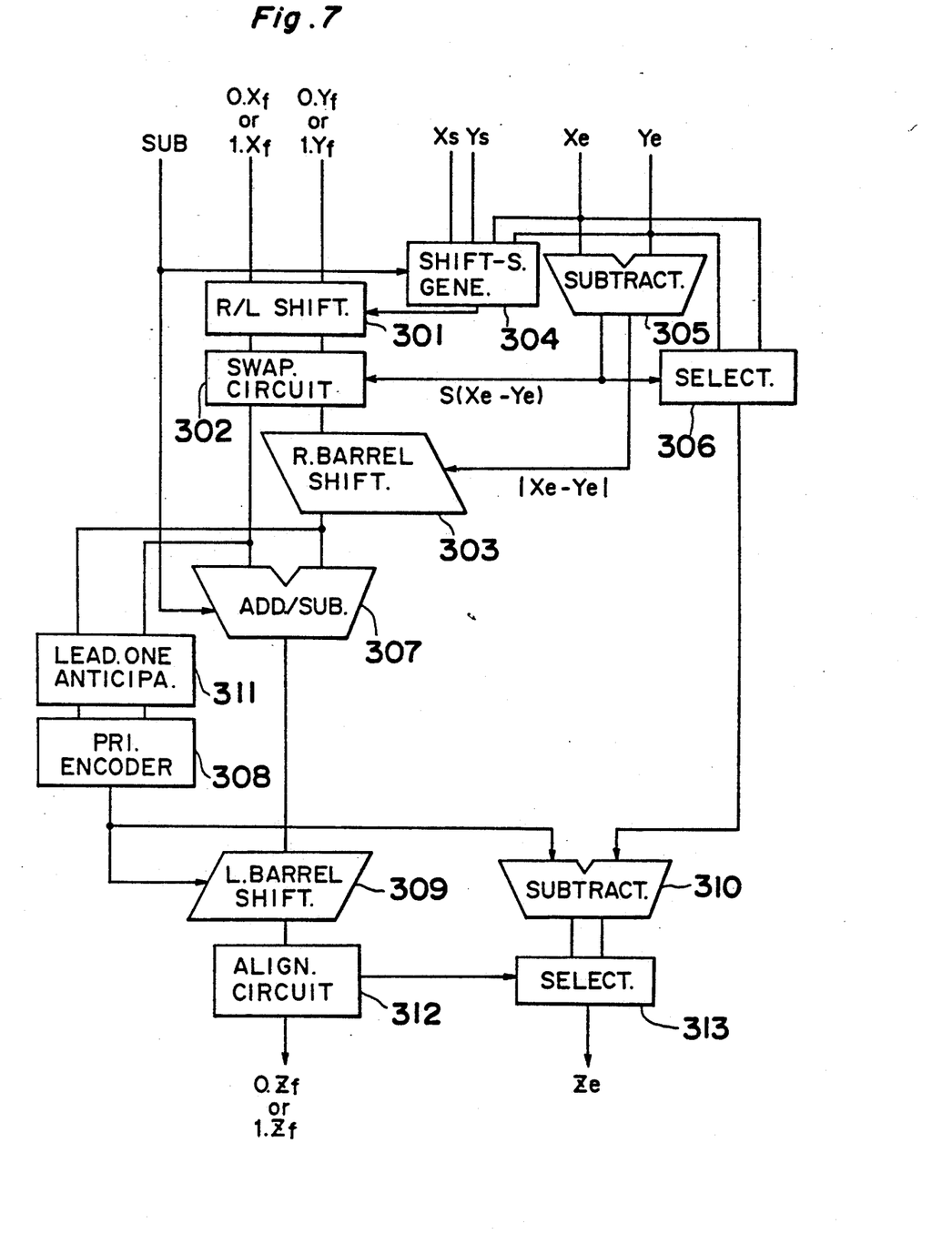
FIG. 7 is a block diagram of a floating point addition/subtraction apparatus according to the present invention employing the leading one anticipator of FIG. 2.

FIG. 7 depicts a mantissa part operation section of a floating point addition/subtraction apparatus to which a leading one anticipator according to the present invention is applied.

Similar to the conventional apparatus described previously, when two floating point data or operands X and Y each having a mantissa part, an exponent part, and a sign part are subjected to subtraction, an alignment processing, a mantissa part addition/subtraction processing, and a normalization processing are performed in this order.

The alignment processing is initially performed as follows.

Exponents parts Xe and Ye of the two operands X and Y are inputted into a subtracter 305, a Shift-signal generator 304, and a selector 306. At the same time, mantissa parts (1.Xf or 0.Xf, 1.Yf or 0.Yf) of the operands X and Y are inputted into a right/left shifter 301. At this time, the subtracter 305 performs a subtraction with respect to the exponent parts Xe and Ye and generates an absolute value |Xe−Ye| and a sign value S(Xe−Ye). The Shift-signal generator 304 determines whether or not each of the two operands X and Y is a normalized numeral and generates a control signal required for shifting the mantissa parts of the two operands right or left with the use of sign values Xs and Ys of the operands and a subtraction signal SUB. The right/left shifter 301 shifts the two mantissa parts right or left based on the control signal from the Shift-signal generator 304. Outputs from the right/left shifter 301 are inputted into a swapping circuit 302, in which they are swapped based on the sign value S(Xe−Ye) outputted from the subtracter 305. A mantissa value of one operand having a smaller exponent value is inputted into a right barrel shifter 303 whereas that of the other operand is inputted into an adder/subtracter 307. The right barrel shifter 303 shifts right the value inputted thereinto by the absolute value |Xe−Ye| indicative of the difference between the two exponent values outputted from the subtracter 305.

Subsequently, an addition/subtraction processing and a rounding processing are performed in the adder/subtracter 307.

Thereafter, a normalization processing is performed which is discussed hereinafter. The result outputted from the adder/subtracter 307 is inputted into a left barrel shifter 309. In parallel with the alignment processing and the addition/subtraction processing, the mantissa values are caused to pass a leading one anticipator 311 and a priority encoder 308 for anticipation of the amount of digit drop of the output value from the adder/subtracter 307. As soon as the result is obtained in the adder/subtracter 307, it is normalized in the left barrel shifter 309. When the leading one position is one digit upper than the leading significant digit position at the time of a subtraction, and therefore, the amount of digit drop anticipated by the leading one anticipator 311 differs by "1" from the actual amount, an output from the left barrel shifter 309 is further normalized in an alignment circuit 312. However, this normalization is performed at a high speed because the amount of left shift is only one digit.

As to the two exponent values Xe and Ye inputted into the selector 306, one exponent value which is not less than the other is selected in accordance with the sign value S(Xe−Ye). An output from the selector 306 is inputted into a subtracter 310, which initially performs a first subtraction in which the shift amount detected by the priority encoder 308 is subtracted from an output value of the selector 306. The subtracter 310 further performs a second subtraction in which "1" is subtracted from the result of the first subtraction. The results of the first and second subtractions are both inputted into a selector 313, which in turn outputs an exponent value Ze of the result of a floating point addition/subtraction in accordance with a control signal from the alignment circuit 312. When the one digit left shift is performed by the alignment circuit 312, the result of the second subtraction is selected by the selector 313.

The floating point addition/subtraction apparatus according to the present invention can anticipate, in parallel with an addition/subtraction of the mantissa parts, the amount of shift required for normalization of the result of a subtraction at a high speed by the use of the leading one anticipator 311 and the priority encoder 308. Even if the alignment circuit 312 must be used, the floating point addition/subtraction can be performed at a high speed because the alignment circuit 312 can perform a high-speed processing.

As is clear from the above, with the use of a leading one anticipator according to the present invention, the amount of digit drop, which may occur at the time of a subtraction, can be anticipated within a given time irrespective of the number of digits of operands. By incorporating this leading one anticipator into a floating point addition/subtraction apparatus, it is possible to simultaneously perform both a subtraction of mantissa values and an anticipation of the amount of digit drop at the time of a mantissa subtraction. As a result, a high-speed floating point addition/subtraction can be realized.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. Apparatus for identifying a limited number of positions within a result of a floating point operation, wherein a leading 1 or 0 is located in one of the positions, said apparatus suitable for use in a leading one anticipator of an operation apparatus, and comprising:

subtraction means for performing a subtraction with respect to a binary minuend having i digits and a binary subtrahend having j digits to generate a redundant binary numeral Zsd having "−1", "0" or "1" at each digit thereof, each of said i and j being an integer;

a plurality of intermediate-carry/intermediate-sum generating (ICISG) means coupled to the subtraction means, each ICISG means generating an intermediate carry $C_k$ and an intermediate sum $S_k$ in accordance with $Zsd_k = 2C_k + S_k$ by use of a redundant binary numeral $Zsd_k$ positioned at a kth digit from a least significant digit of said redundant binary numeral Zsd and a redundant binary numeral $Zsd_{k+1}$ positioned at a (k+1)th digit from said least significant digit so that $C_k = Zsd_k$ when $Zsd_{k+1} =$ "1" or "1" and $C_k = 0$ when $Zsd_{k+1} =$ "0", said k being an integer; and a plurality of circuits, each coupled to a respective ICISG means, each circuit generating a signal $Z_k$ so that said signal $Z_k$ indicates a first numeral when a result of an addition with respect to an intermediate carry $C_{k-1}$ transferred from a next-lower order digit and said intermediate sum $S_k$ is "0" and said signal $Z_k$ indicates a second number when said result of the addition is a numeral other than "0", a position of a leading second numeral indicated by said signal $Z_k$ indicating one of a same digit position as a leading significant digit position of a result obtained by said operation apparatus and a digit position one digit above said leading significant digit position.

2. Apparatus for identifying a limited number of positions within a result of a floating point operation, wherein a leading 1 or 0 is located in one of the positions, said apparatus suitable for use in a leading one anticipate of an operation apparatus, and comprising:

a plurality of leading 1/0 detectors, each of which comprises:

three OR type gates positioned at a first stage;

two OR type gates positioned at a second stage; and an AND-NOR gate positioned at a third stage, wherein, a binary numeral $X_k$ is inputted into first and second OR type gates of the first stage whereas a binary numeral $Y_k$ is inputted into first and third OR type gates of the first stage, wherein said second and third OR type gates of the first stage also receive a binary numeral $X_{k-1}$ transferred from a next-lower-order digit and a binary numeral $Y_{k-1}$ transferred from the next-lower-order digit, respectively, wherein an output from said second OR type gate of the first stage and that from said third OR type gate of the first stage are inputted into first and second OR type gates of the second stage, respectively, and an output from a first OR type gate of a first stage of a next-higher-order digit is inputted into said first and second OR type gates of the second stage, and wherein an output from said first OR type gate of the first stage, that from said first OR type gate of the second stage, and that from said second OR type gate of the second stage are inputted into said AND-NOR gate, and said AND-OR gate outputs a binary numeral $Z_k$, each of said $X_k$, said $Y_k$, and said $Z_k$ being a binary numeral positioned at a kth digit, said k being an integer.

3. The apparatus according to claim 2, wherein said first OR type gate of the first stage is an EX-NOR gate.

4. The apparatus according to claim 3, wherein each of said second and third OR type gates of the first stage is an EX-NOR gate whereas each of said OR type gates of the second stage is an EX-OR gate.

5. The apparatus according to claim 3, wherein each of said second and third OR type gates of the first stage is an EX-OR gate whereas each of said OR type gates of the second stage is an EX-NOR gate.

6. The apparatus according to claim 3, wherein each of said second OR type gate of the first stage and said second OR type gate of the second stage is an EX-NOR gate whereas each of said third OR type gate of the first stage and said first OR type gate of the second stage is an EX-OR gate.

7. The apparatus according to claim 3, wherein each of said second OR type gate of the first stage and said second OR type gate of the second stage is an EX-OR gate whereas each of said third OR type gate of the first stage and said first OR type gate of the second stage is an EX-NOR gate.

8. A floating point addition/subtraction apparatus for performing an addition or subtraction with respect to two floating point operands each having a mantissa operand, an exponent operand, and a sign operand, said apparatus comprising:

an adder/subtractor for performing an addition or subtraction with respect to the mantissa operands of said two operands after an digit alignment processing;

leading one anticipator means comprising:

A subtraction means for performing a subtraction with respect to a binary minuend having i digits and a binary subtrahend having j digits to generate a redundant binary numeral Zsd having "$-1$", "$0$" or "$1$" at each digit thereof, each of said i and j being an integer, a plurality of intermediate-carry/intermediate-sum generating (ICISG) means coupled to the subtraction means, each ICISG means generating an intermediate carry $C_k$ and an intermediate sum $S_k$ in accordance with $Zsd_k = 2C_k + S_k$ by use of a redundant binary numeral $Zsd_k$ positioned at a $k^{th}$ digit from a least significant digit of said redundant binary numeral Zsd and a redundant binary numeral $Zsd_{k+1}$ positioned at a $(k+1)^{th}$ digit from said least significant digit so that $C_k = Zsd_k$ when $Zsd_{k+1} = $ "1" or "$-1$" and $C_k = 0$ when $Zsd_{k+1} = $ "0", said k being an integer, and a plurality of addition means, each coupled to a respective ICISG means, each addition means generating a signal $Z_k$ so that said signal $Z_k$ indicates a first numeral when a result of an addition with respect to an intermediate carry $C_{k-1}$ transferred from a next-lower-order digit and said intermediate sum $S_k$ is "0" and said signal $Z_k$ indicates a second numeral when said result of the addition is a numeral other than "0", a position of a leading second numeral indicated by said signal $Z_k$ indicating one of a same digit position as a leading significant digit position of a result obtained by said adder/subtractor and a digit position one digit upper than said leading significant digit position;

a priority encoder for receiving said signal $Z_k$ from said leading one anticipator means to determine the number of non-significant digits from a most significant digit, and for producing an output signal therefrom identifying a shift value;

a left barrel shifter for receiving the output signal of the priority encoder and a result of a subtraction performed by said adder/subtracter, and for shifting said result of the subtraction left according to the output signal of the priority encoder to form a normalized result; and an alignment circuit for shifting the normalized result left by an additional digit if the normalized result has a leading zero;

whereby a normalization processing is performed in parallel with an addition or subtraction of the mantissa parts of said minuend and subtrahend.

* * * * *

UNITED STATES PATENT AND TRADEMARK OFFICE
CERTIFICATE OF CORRECTION

PATENT NO. : 5,282,156

DATED : January 25, 1994

INVENTOR(S) : Miyoshi, et al

It is certified that error appears in the above-indentified patent and that said Letters Patent is hereby corrected as shown below:

Column 12, lines 37 and 38,
the word "anintermediate" should be --an intermediate--.

Column 12, line 45,
"$Zsd_{k+1}$="1" or "1" should be --$Zsd_{k+1}$="1" or "-1"--.

Column 12, line 53, the
word "number" should be --numeral--.

Column 12, line 65, the
word "anticipate" should be --anticipator--.

In claim 8, the indentation should be as follows:

8. A floating point addition/subtraction apparatus for performing an addition or subtraction with respect to two floating point operands each having a mantissa operand, an exponent operand, and a sign operand, said apparatus comprising:

an adder/subtractor for performing an addition or subtraction with respect to the mantissa operands of said two operands after an digit alignment processing;

UNITED STATES PATENT AND TRADEMARK OFFICE
CERTIFICATE OF CORRECTION

PATENT NO. : 5,282,156
DATED : January 25, 1994
INVENTOR(S) : Miyoshi, et al

It is certified that error appears in the above-indentified patent and that said Letters Patent is hereby corrected as shown below:

leading one anticipator means comprising:

A subtraction means for performing a subtraction with respect to a binary minuend having i digits and a binary subtrahend having j digits to generate a redundant binary numeral Zsd having "-1", "0" or "1" at each digit thereof, each of said i and j being an integer, a plurality of intermediate-carry/intermediate-sum generating (ICISG) means coupled to the subtraction means, each ICISG means generating an intermediate carry $C_k$ and an intermediate sum $S_k$ in accordance with $Zsd_k = 2C_k + S_k$ by use of a redundant binary numeral $Zsd_k$ positioned at a $k^{th}$ digit from a least significant digit of said redundant binary numeral Zsd and a redundant binary numeral $Zsd_{k+1}$ positioned at a $(k+1)^{th}$ digit from said least significant digit so that $C_k = Zsd_k$ when $Zsd_{k+1} = $ "1" or "-1" and $C_k = 0$ when $Zsd_{k+1} = $ "0", said k being an integer, and

UNITED STATES PATENT AND TRADEMARK OFFICE
CERTIFICATE OF CORRECTION

PATENT NO. : 5,282,156
DATED : January 25, 1994
INVENTOR(S) : Miyoshi, et al

It is certified that error appears in the above-indentified patent and that said Letters Patent is hereby corrected as shown below:

a plurality of addition means, each coupled to a respective ICISG means, each addition means generating a signal $Z_k$ so that said signal $Z_k$ indicates a first numeral when a result of an addition with respect to an intermediate carry $C_{k-1}$ transferred from a next-lower-order digit and said intermediate sum $S_k$ is "0" and said signal $Z_k$ indicates a second numeral when said result of the addition is a numeral other than "0", a position of a leading second numeral indicated by said signal $Z_k$ indicating one of a same digit position as a leading significant digit position of a result obtained by said adder/subtractor and a digit position one digit upper than said leading significant digit position;

a priority encoder for receiving said signal $Z_k$ from said leading one anticipator means to determine the number of non-significant digits from a most significant digit, and for producing an output signal therefrom identifying a shift value;

UNITED STATES PATENT AND TRADEMARK OFFICE
CERTIFICATE OF CORRECTION

PATENT NO. : 5,282,156
DATED : January 25, 1994
INVENTOR(S) : Miyoshi, et al

It is certified that error appears in the above-indentified patent and that said Letters Patent is hereby corrected as shown below:

a left barrel shifter for receiving the output signal of the priority encoder and a result of a subtraction performed by said adder/subtracter, and for shifting said result of the subtraction left according to the output signal of the priority encoder to form a normalized result; and     an alignment circuit for shifting the normalized result left by an additional digit if the normalized result has a leading zero;

whereby a normalization processing is performed in parallel with an addition or subtraction of the mantissa parts of said minuend and subtrahend.

Signed and Sealed this

Sixth Day of September, 1994

Attest:

BRUCE LEHMAN

Attesting Officer     Commissioner of Patents and Trademarks